(12) United States Patent
Tokui et al.

(10) Patent No.: US 7,255,398 B2
(45) Date of Patent: Aug. 14, 2007

(54) SEAT RECLINING APPARATUS

(75) Inventors: Hideki Tokui, Kosai (JP); Akira Nemoto, Akishima (JP)

(73) Assignees: Fujikiko Kabushiki Kaisha (JP); Tachi-S Co., Ltd. (JP)

( * ) Notice: Subject to any disclaimer, the term of this patent is extended or adjusted under 35 U.S.C. 154(b) by 109 days.

(21) Appl. No.: 11/115,878

(22) Filed: Apr. 27, 2005

(65) Prior Publication Data

US 2006/0091712 A1 May 4, 2006

(30) Foreign Application Priority Data

Oct. 26, 2004 (JP) ............................ P2004-310930

(51) Int. Cl.
*B60N 2/02* (2006.01)
(52) U.S. Cl. ................. 297/367; 297/366; 297/378.12; 297/354.12
(58) Field of Classification Search ................. 297/366, 297/367, 378.12, 354.12
See application file for complete search history.

(56) References Cited

U.S. PATENT DOCUMENTS

| 5,393,123 A | * | 2/1995 | Hernandez et al. | .... 297/378.12 |
| 6,007,153 A | * | 12/1999 | Benoit et al. | .......... 297/378.12 |
| 6,106,067 A | * | 8/2000 | Zhuang et al. | ............ 297/361.1 |
| 6,659,557 B2 | * | 12/2003 | Deptolla | ..................... 297/367 |
| 6,739,668 B2 | * | 5/2004 | Coman et al. | ......... 297/378.12 |
| 2003/0080600 A1 | | 5/2003 | Eppert | |

FOREIGN PATENT DOCUMENTS

| JP | 08-182558 | 7/1996 |
| JP | 2003-516834 | 5/2003 |
| JP | 2004-121508 | 4/2004 |

* cited by examiner

*Primary Examiner*—David Dunn
*Assistant Examiner*—Erika Garrett
(74) *Attorney, Agent, or Firm*—Kilpatrick Stockton LLP

(57) ABSTRACT

A seat reclining apparatus is provided with a neutral position returning means which holds a link lever at a forward reclining operating position, and releases the holding of the link lever in the case that a seat back is shifted from a forward reclined position side to a neutral position within a reclining range. The neutral position returning means shifts a cam plate by a spring in such a manner as to hole the position of the link lever at a lever rotating position while the link lever rotates a releasing lever fixed to a center shaft of a reclining lock mechanism together therewith so as to release a lock of the reclining lock mechanism, and shifts the cam plate to an original position against the spring by a cam releasing means so as to return the link lever to an original position, in the case that the forward reclining seat back 3 is shifted to the neutral position.

5 Claims, 14 Drawing Sheets

SEAT RECLINING APPARATUS

BACKGROUND OF THE INVENTION

1. Field of the Invention

The present invention relates to a seat reclining apparatus which can lock a seat back to a seat cushion rotatably and at a desired rotational position.

2. Description of the Related Art

As this kind of seat reclining apparatus, there has been proposed a structure disclosed in Japanese Patent Application Laid-Open No. 2004-121508.

A seat reclining apparatus 100 is provided in each of both left and right rear portions of a seat cushion (not shown), and has a pair of base brackets 101 (not shown) fixed to both left and right ends of the seat cushion side, and a pair of arm brackets 102 (not shown) fixed to both left and right ends in the seat back side, as shown in FIG. 1. Reclining lock mechanisms 110 are respectively arranged between the left and right base brackets 101 (not shown) and the arm brackets 102 (not shown). Accordingly, each of the arm brackets 102 (not shown) is supported to each of the base brackets 101 (not shown) so as to be rotatable around a center shaft 103 (not shown). In this case, the center shafts are connected therebetween by a connection pipe (not shown), and both the center shafts 103 (not shown) are integrally rotated.

A spiral spring 104 is arranged in an outer peripheral side of the center shaft 103. The spiral spring 104 is structured such that one end thereof is hooked to the seat cushion side base bracket 101 and the other end is hooked to the seat back side arm bracket 102, and the seat back is biased to a forward reclined position side by a spring force of the spiral spring 104.

The reclining lock mechanism 110 is provided with a base side disc case 111 fixed to the base bracket 101, an arm side disc case 112 fixed to the arm bracket 102 and having an inner peripheral gear 113 formed in an inner periphery, a pair of lock tooth 114 and 114 received in an outer peripheral side within a chamber formed by both the disc cases 111 and 112, a cam plate 115 received in an inner peripheral side within the chamber formed by both the disc cases 111 and 112 and having the center cam shaft 103 fitted thereto, and a pair of lock springs 116 and 116 biasing the cam plate 115 in a counterclockwise direction in FIG. 2 (toward a lock position), as shown in FIGS. 2 and 3. Each of the lock tooth 114 and 114 is supported so as to freely swing around a supporting point 114a, and outer peripheral gears 117 and 117 are formed respectively in outer peripheries of the lock tooth 114 and 114.

A reclining operating lever 120 (shown in FIG. 1) and a forward reclining operating lever (not shown) are attached to a part of the center shaft 103 protruding from the reclining lock mechanism 110 directly or via a connection member, and the structure is made such that a lock of the reclining lock mechanism 110 can be released by operating the operating levers 120 (not shown).

In the structure mentioned above, the reclining lock mechanism 110 is structured such that the outer peripheral gears 117 and 117 of the lock tooth 114 and 114 are engaged with the inner peripheral gears 113 and 113 of the arm side disc case 112 by the spring forces of the lock springs 116 and 116, whereby the seat back is locked with respect to the seat cushion. When a user operates the reclining operating lever 120 so as to rotate the center shaft 103 in a clockwise direction in FIG. 2 against the spring forces of the lock springs 116 and 116, the engagement between the inner peripheral gears 113 and 113 and the outer peripheral gears 117 and 117 is disconnected so as to release the lock. When the lock is released, the seat back is moved to the forward reclining position by the spring force of the spiral spring 104. When the user takes off a hand from the reclining operating lever 120, the reclining lock mechanism 110 becomes in a state of being biased to the lock position side by the spring forces of the lock springs 116 and 116, however, since the lock tooth 114 is in a state of running on an inner peripheral toothless portion 113a continuously formed in the inner peripheral gear 113, the lock tooth 114 is not locked.

When the user draws up the seat back against the spring force of the spiral spring 104 so as to return the seat back at the forward reclined position to a desired reclining position, the lock tooth 114 and 114 slip and move on the inner peripheral toothless portions 113a and 113a, and are locked at a position in which the inner peripheral gears 113 and 113 and the outer peripheral gears 117 and 117 are first engaged with each other.

When returning the seat back at the forward reclined position to the reclining range as mentioned above, the lock is engaged at the forefront position in the reclining range, however, this forefront position is set in a state in which the seat back rises more than a generally used position, it is necessary for the user to again operate the reclining operating lever 120 so as to release the lock of the reclining lock mechanism 110 and set the seat back to the desired reclining position. Accordingly, it is troublesome to operate for returning the seat back at the forward reclined position to the predetermined reclining position, and it can not be said to be good usability.

Accordingly, there has been proposed a structure in which a full memory means for storing a reclining position just before being forward reclined is provided, and the seat back at the forward reclined position is returned to the previous reclining position by the full memory means in the case that the seat back is drawn up so as to be returned to the reclining range (refer to Patent Brochure of Japanese National Publication of Translated Version (Kohyo) No. 2003-516834). Further, there has been proposed a structure in which another lock mechanism than the reclining lock mechanism is provided, and the seat back at the forward reclined position is returned to a predetermined reclining position by the other lock mechanism when the seat back is drawn up to the reclining range (refer to Japanese Patent Application Laid-Open No. 8-182558).

However, since it is necessary that the seat reclining apparatus provided with the full memory means is structured such that all the reclining positions can be stored, there are problems that the structure is complicated, and a cost is increased. Since the full memory means is installed in an inner portion of the reclining lock mechanism, there are problems that it is necessary to employ a major design change, and the full memory means can not be installed to the existing seat reclining apparatus afterward. In addition, in the case of forward reclining the seat back existing at a flat position, the seat back is not locked until it reaches the flat position even by drawing up the seat back so as to return to the reclining range. Accordingly, a usability is not good.

Further, in the seat reclining apparatus provided with the other lock mechanism, since it is necessary to add the independent lock mechanism to the existing reclining lock mechanism, there are problems that the structure is complicated and a cost is increased, in the same manner as the former case. Further, since the load applied from the seat back is received by the other lock mechanism, a strength equal to the existing lock mechanism is required, so that it is necessary to control the strength of the other lock mechanism.

SUMMARY OF THE INVENTION

Accordingly, the present invention is made for the purpose of solving the problems mentioned above, and an object of the present invention is to provide a seat reclining apparatus which is simple in structure, has a reduced cost and can be installed with a slight design change by returning a forward reclined seat back to a predetermined neutral position, and can reduce a strength control with respect to a load applied from the seat back.

In accordance with a first aspect of the present invention, there is provided a seat reclining apparatus comprising: a seat cushion (1); a seat back (3) rotatably supported to the seat cushion (1); a forward reclining biasing means (6) for biasing the seat back (3) to a forward reclined position side; a reclining lock mechanism (7) shifting the seat back (3) between a lock position locked at an optional position in a reclining range and a lock release position releasing the lock, and exposed to a lock biasing force toward the lock position side; a forward reclining lever (12, 13) shifting the reclining lock mechanism (7) to the lock release position, in which the reclining lock mechanism (7) is shifted to the lock release position from the lock position by operating the forward reclining lever (12, 13) to a forward reclining operating position, and the seat back (3) is shifted to the forward reclined position by an biasing force of the forward reclining biasing means (6); and a neutral position returning means (10) holding the forward reclining lever (12, 13) operated to the forward reclining operating position at the forward reclining operating position in the case that the seat back (3) exists in a forward reclined side from a predetermined neutral position set within the reclining range, and not holding the forward reclining lever (12, 13) in the case that the seat back (3) exists in a rearward reclined side from the neutral position.

In accordance with the structure mentioned above, since the neutral position returning means (10) is structured such as to lock the forward reclining lever (12, 13) and release the lock, it is possible to achieve a simple structure and a cost reduction. Since the neutral position returning means (10) is structured such as to lock the forward reclining lever (12, 13) and release the lock, the neutral position returning means (10) can be installed in an outer portion of the reclining lock mechanism (7). Accordingly, the neutral position returning means (10) can be installed with a slight design change, and can be easily installed afterward with respect to the existing seat reclining apparatus.

Further, since the seat back (3) is returned to the predetermined neutral position regardless of the position just before the forward reclining, by returning the seat back (3) to the reclining position, an improved usability can be obtained. Since the load applied from the seat back (3) can be received by the reclining lock mechanism (7) by returning the forward reclined seat back (3) to the reclining range, it is possible to reduce the strength control or the like.

In accordance with a second aspect of the present invention, there is provided a seat reclining apparatus according to the first aspect, further comprising: a reclining operating lever (8) shifting the reclining lock mechanism (7) to the lock release position independent from the forward reclining lever (12, 13), wherein the forward reclining lever (12, 13) is held at a standby position without being operated to the forward reclined position at a time of operating the reclining operating lever (8) to the lock release position.

According to the structure defined in the second aspect of the present invention, the structure is made such that the forward reclining lever (12, 13) is set independent from the reclining operating lever (8) executing the normal reclining operation, and the forward reclining lever (12, 13) does not work at a time of operating the reclining operating lever (8). Accordingly, it is possible to activate the neutral position returning means only at a time of operating the forward reclining lever (12, 13). Further, since the forward reclining lever (12, 13) does not work at a time of the reclining operation, it is possible to lighten the operating force, and it is possible to prevent a tooth jump by making an inertial mass small.

In accordance with a third aspect of the present invention, there is provided a seat reclining apparatus according to the first aspect or the second aspect, wherein the forward reclining lever (12, 13) includes: a releasing lever (12) fixed to a shaft (5) shifting the reclining lock mechanism (7) between the lock position and the lock release position, and integrally rotating with the shaft (5); and a forward reclining link lever (13) associated with a forward reclining operating lever (9) provided in an upper portion of the seat back, shifting from a standby position to a lever rotational position against an biasing force of a lever biasing means (16) when the forward reclining operating lever (9) is shifted from the standby position to the forward reclined position, and rotating the releasing lever (12) together therewith during the shifting process so as to shift the reclining lock mechanism (7) from the lock position to the lock release position, and wherein the neutral position returning means (10) includes: a cam plate (15) capable of shifting between a lever rotation allowing position allowing the rotation of the forward reclining link lever (13) and a lever rotation inhibiting position inhibiting the rotation of the forward reclining link lever (13), when the forward reclining link lever (13) exists at the lever rotating position; a can biasing means (16) for biasing the cam plate (15) to the lever rotation inhibiting position side; and a cam releasing means (17) for shifting the cam plate (15) from the lever rotation inhibiting position to the lever rotation allowing position against the biasing force of the cam biasing means (16) when the seat back (3) is shifted from the forward reclined position side to the predetermined neutral position, and holding the cam plate (15) at the lever rotation allowing position when the seat back (3) exists in a backward reclined side from the neutral position.

In accordance with the invention mentioned above, the forward reclining lever (12, 13) and the neutral position returning means (10) can be achieved by a reduced number of parts, the structure can be simplified, and a production cost can be reduced.

In accordance with a fourth aspect of the present invention, there is provided a seat reclining apparatus according to any one of the first to third aspects, wherein the forward reclining link lever (13) is rotatable around the shaft (5), and is supported in such a manner as to independently rotate from the shaft (5) and the releasing lever (12).

According to the structure defined in the fourth aspect of the present invention, since the releasing lever (12) and the forward reclining link lever (13) can be arranged around the shaft (5), it is possible to make the structure compact on the basis of a high density arrangement of the parts.

In accordance with a fifth aspect of the present invention, there is provided a seat reclining apparatus according to any one of the first to fourth aspects, wherein the forward reclining link lever (13) is rotatably supported at the other position than a center of the shaft (5).

According to the structure defined in the fifth aspect of the present invention, since freedom in arrangement of the releasing lever (12) and the forward reclining link lever (13) is widened, freedom of design can be increased. Further, since the load applied to the shaft (5) is reduced, a reliability of the operation of the shaft (5) is increased.

In accordance with a sixth aspect of the present invention, there is provided a seat reclining apparatus according to any one of the first to fifth aspects, wherein the cam biasing means (16) and the lever biasing means (16) are composed of one spring (16) interposed between the forward reclining link lever (13) and the cam plate (15).

According to the structure defined in the sixth aspect of the present invention, since it is possible to further reduce the number of the parts, the structure can be simplified, and the cost can be reduced.

In accordance with a seventh aspect of the present invention, there is provided a seat reclining apparatus according to any one of the first to sixth aspects, wherein the cam releasing means (17) includes: a pin (20) provided in a free end portion of the cam plate (15); and a cam releasing wall (21) moving associated with the seat back (3), and pressing the pin (20) so as to displace the cam plate (15) to a lever rotation allowing position in the case that the seat back (3) is shifted from the forward reclined position side to the predetermined neutral position, wherein the cam releasing wall (21) interferes with the pin (20) even in the case that the seat back (3) is positioned at a backward reclined side from the neutral position within the reclining range, thereby holding the cam plate (15) at the lever rotation allowing position.

According to the structure defined in the seventh aspect of the present invention, it is possible to regulate the shift of the cam plate (15) when the forward reclining operating lever (9) is operated, in the case that the seat back (3) is positioned in a rear side from the neutral position within the reclining range. Accordingly, it is possible to prevent the disadvantage caused by the matter that the pin (20) of the cam plate (15) run on the cam releasing wall (21).

BRIEF DESCRIPTION OF THE ACCOMPANYING DRAWINGS

DETAILED DESCRIPTION OF THE PREFERRED EMBODIMENTS

Figure 1:
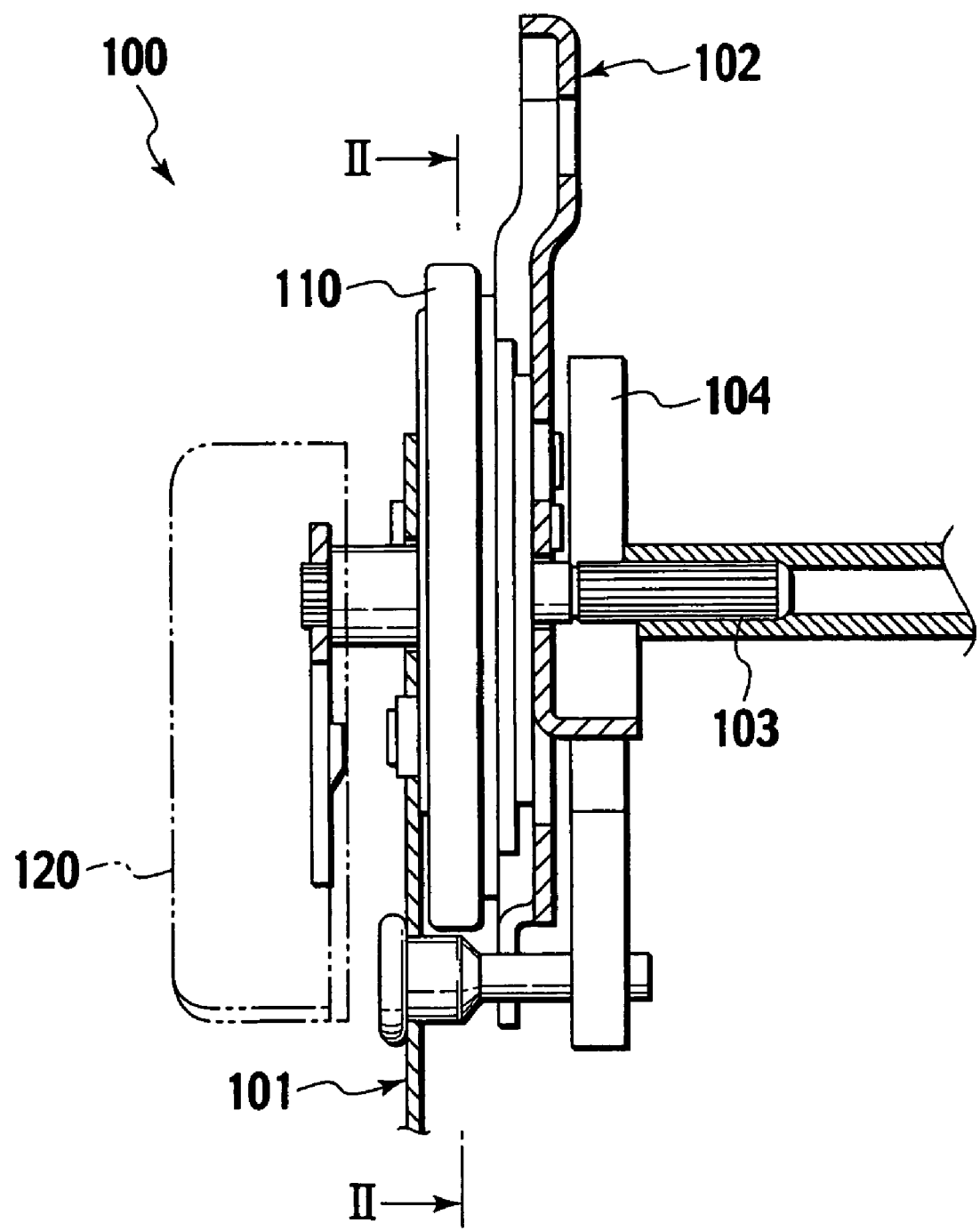
FIG. 1 is a side elevational view of a seat reclining apparatus in accordance with a prior art.

There will be detailed below the preferred embodiments of the present invention with reference to the accompanying drawings. Like members are designated by like reference characters.

Figure 4:
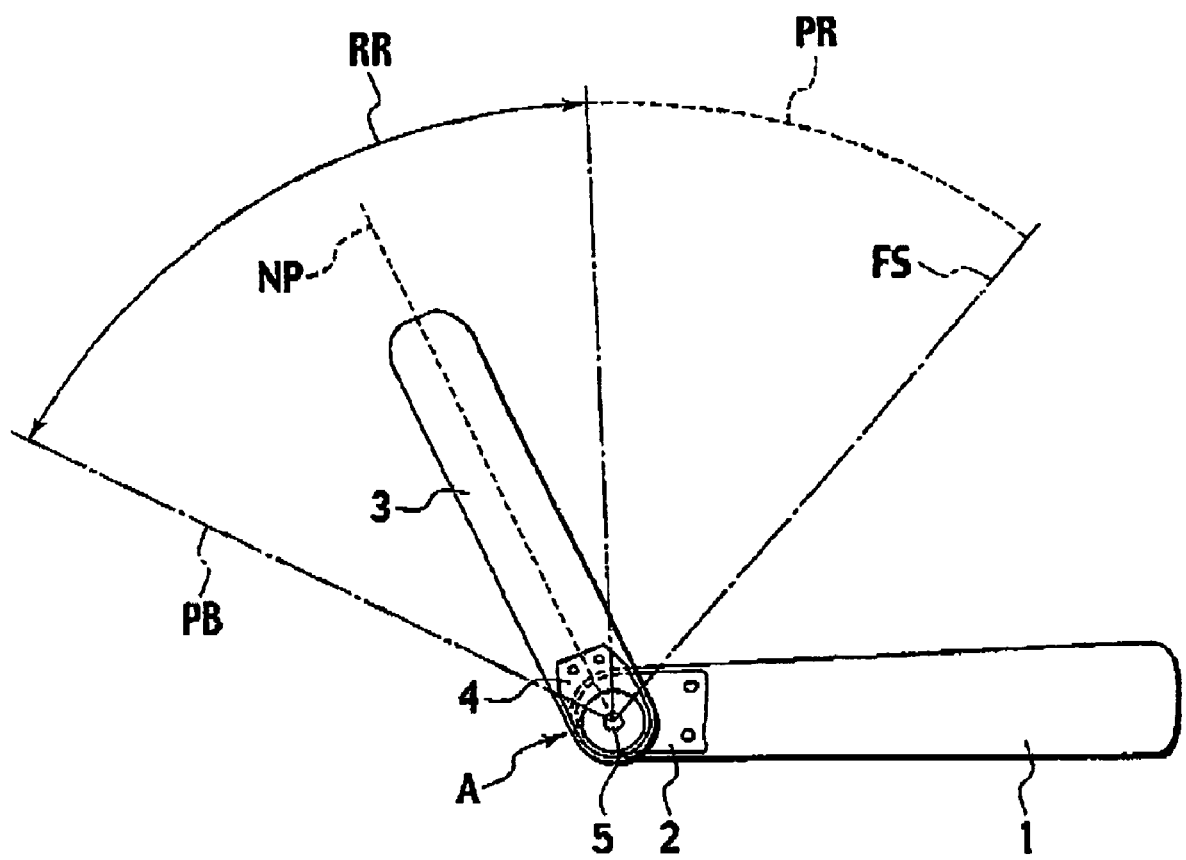
FIG. 4 is a side elevational view showing a rotating range and each of rotating positions of a seat back in accordance with a first embodiment of the present invention.
Figure 5:
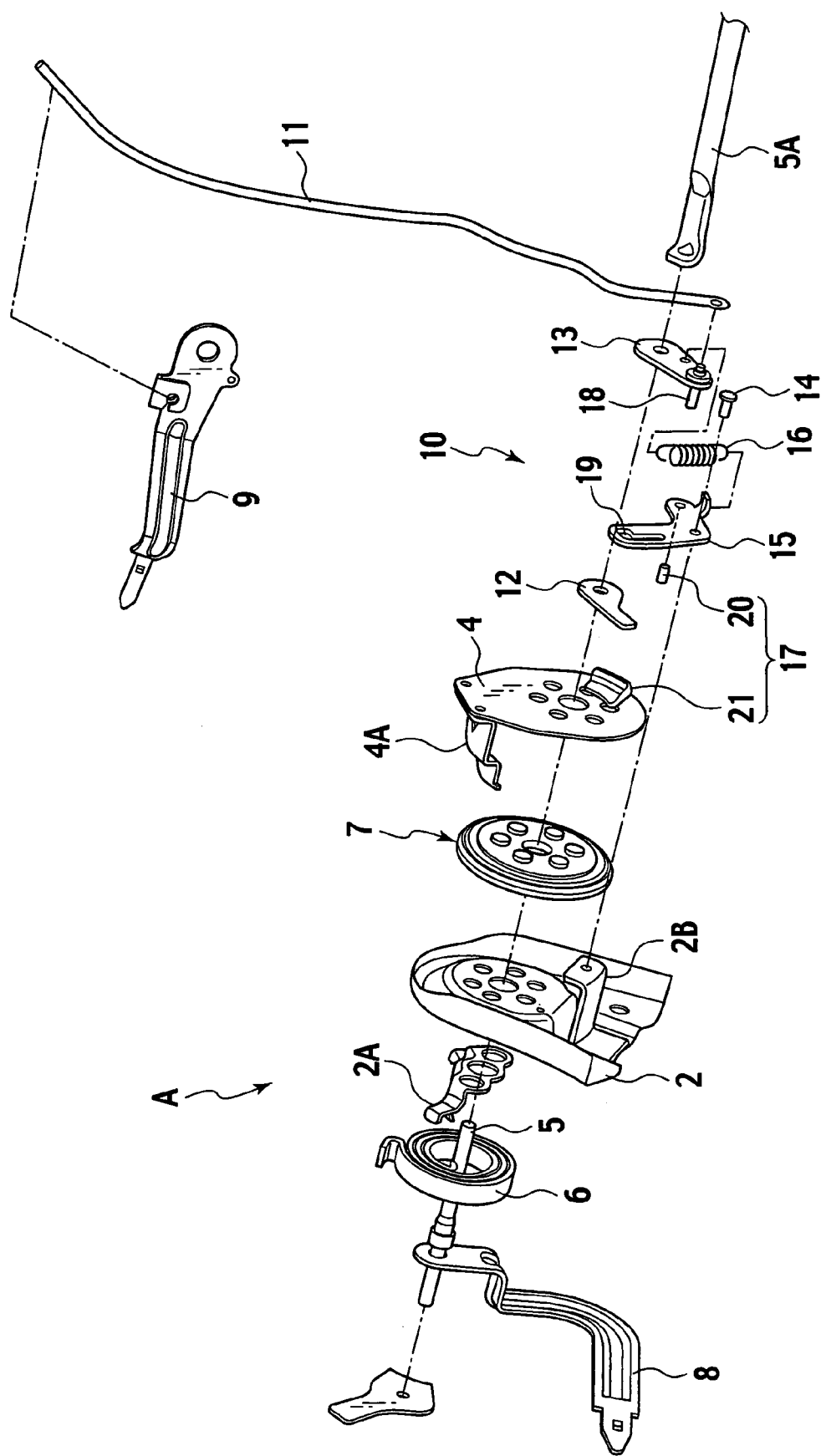
FIG. 5 is an exploded perspective view of a seat reclining apparatus in accordance with the first embodiment of the present invention.
Figure 6:
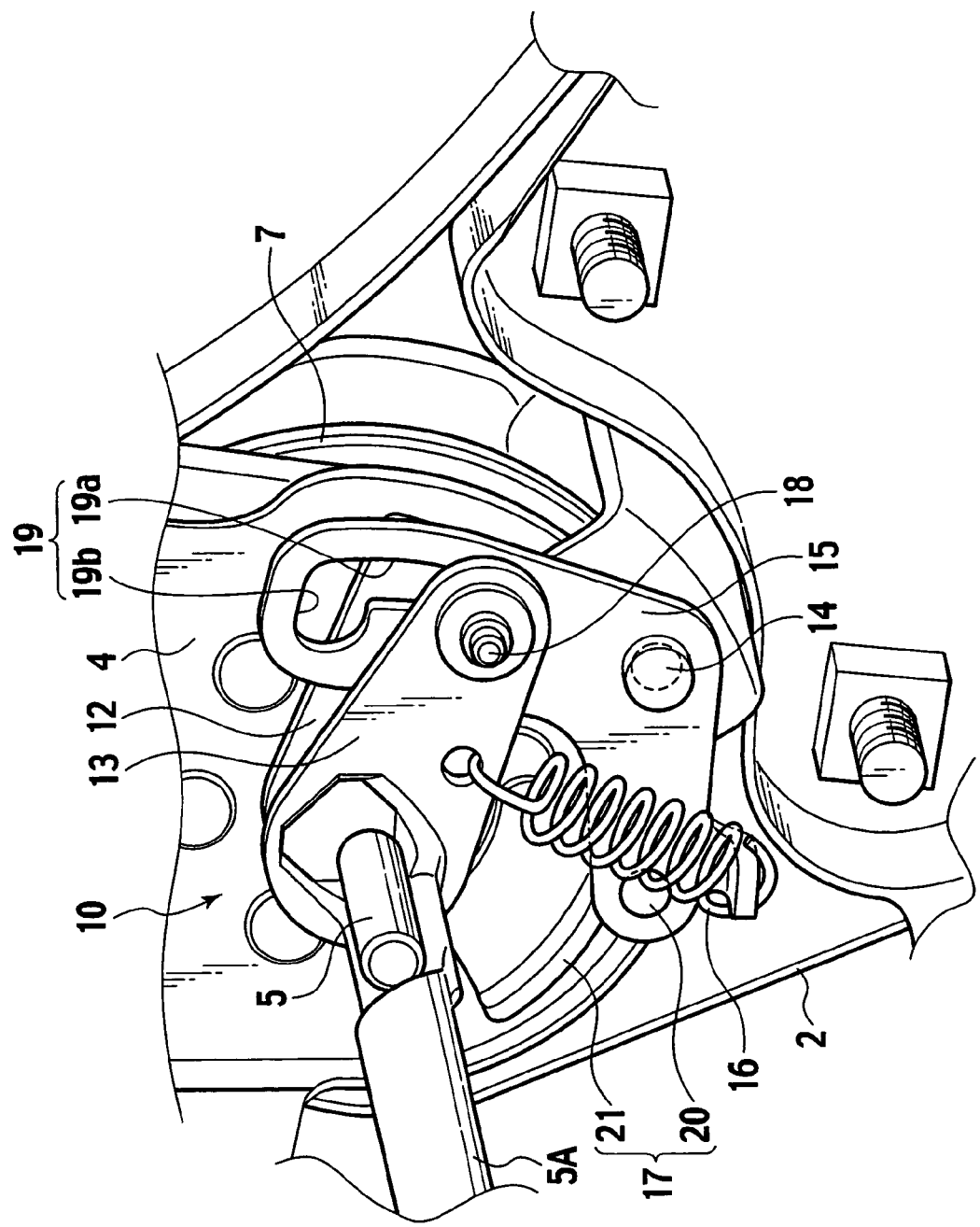
FIG. 6 is a perspective view of the seat reclining apparatus in accordance with the first embodiment of the present invention.
Figure 7:
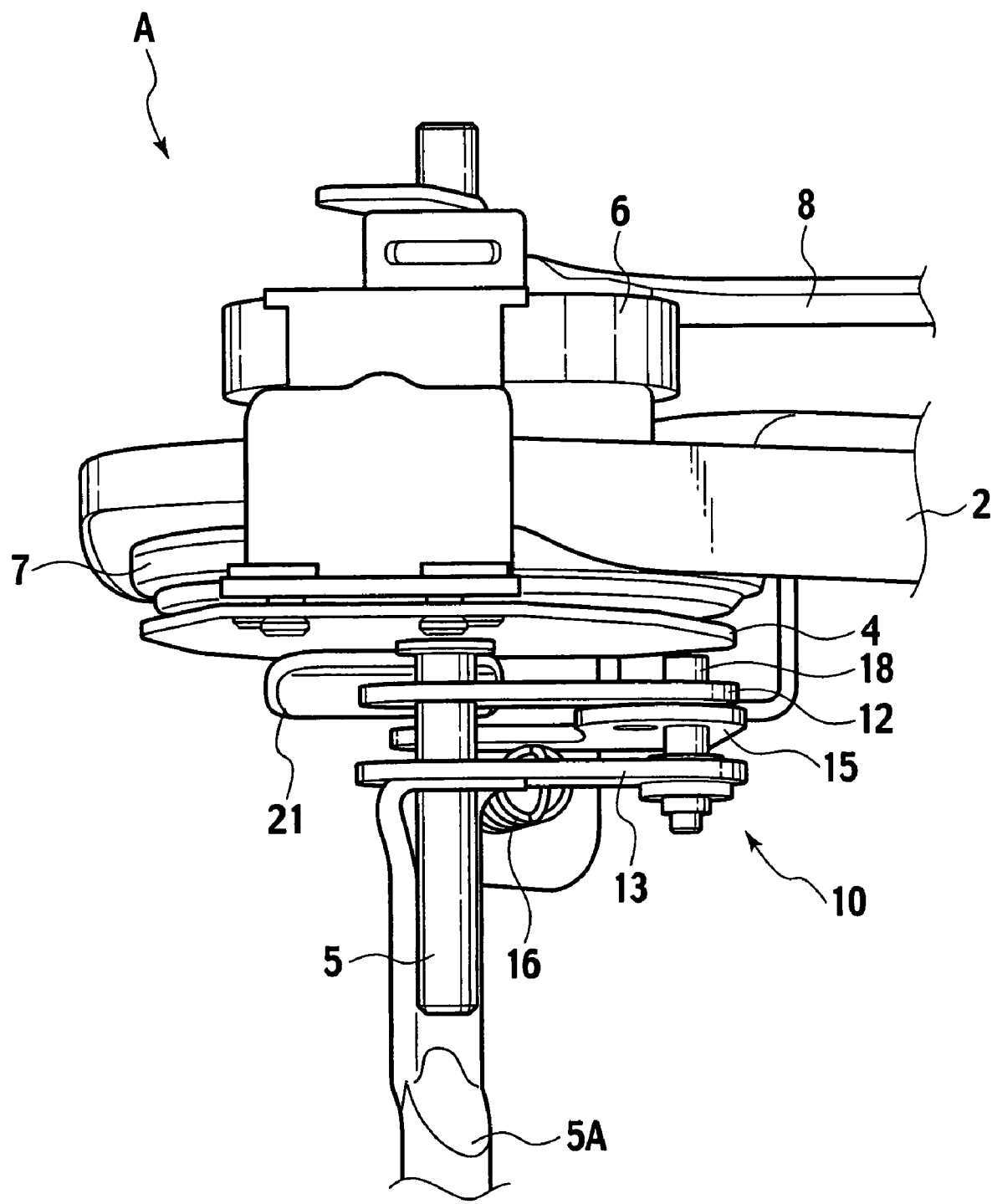
FIG. 7 is a top elevational view of the seat reclining apparatus in accordance with the first embodiment of the present invention.
Figure 8:
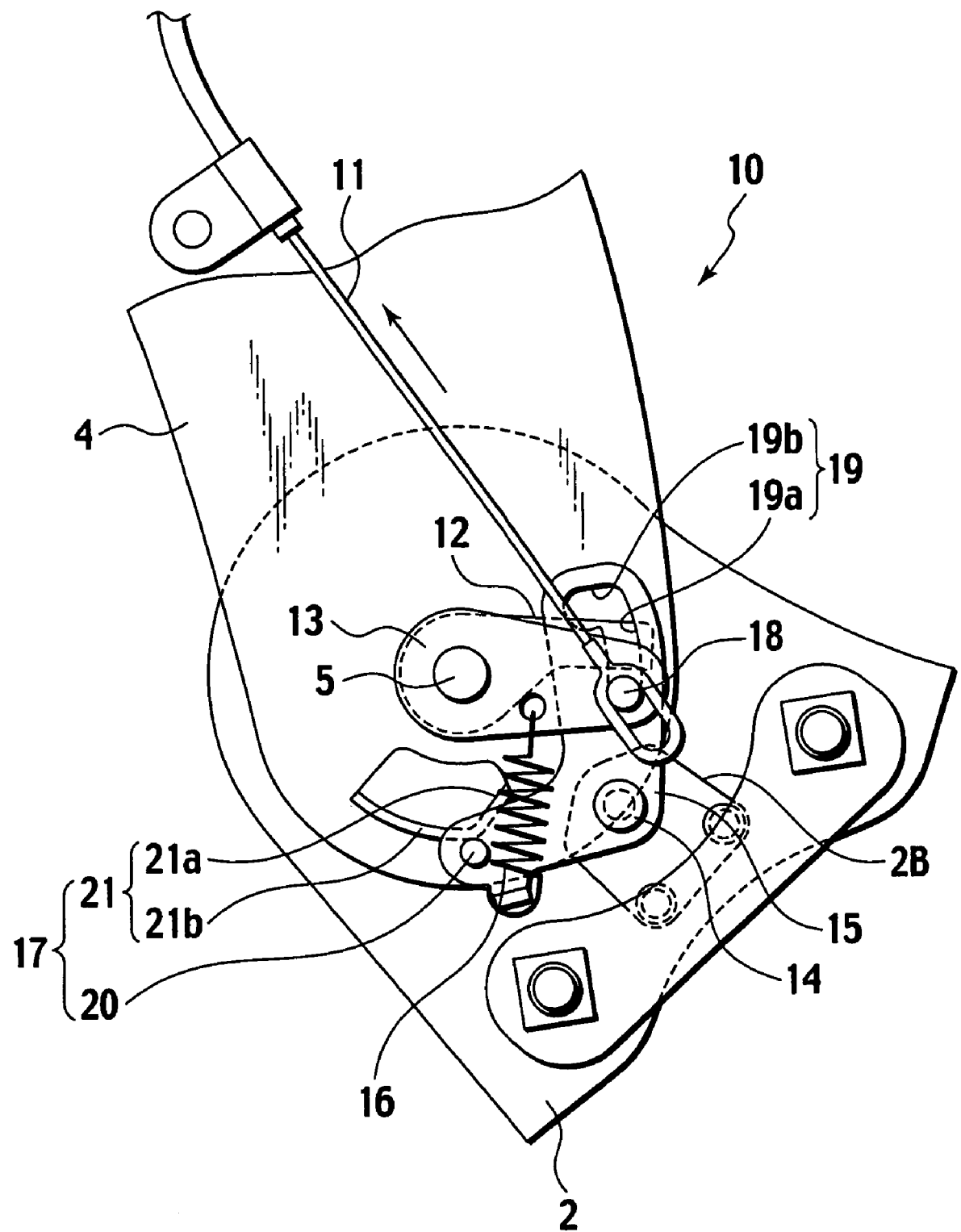
FIG. 8 is a side elevational view for explaining a motion of a neutral position returning means in accordance with the first embodiment of the present invention.
Figure 9:
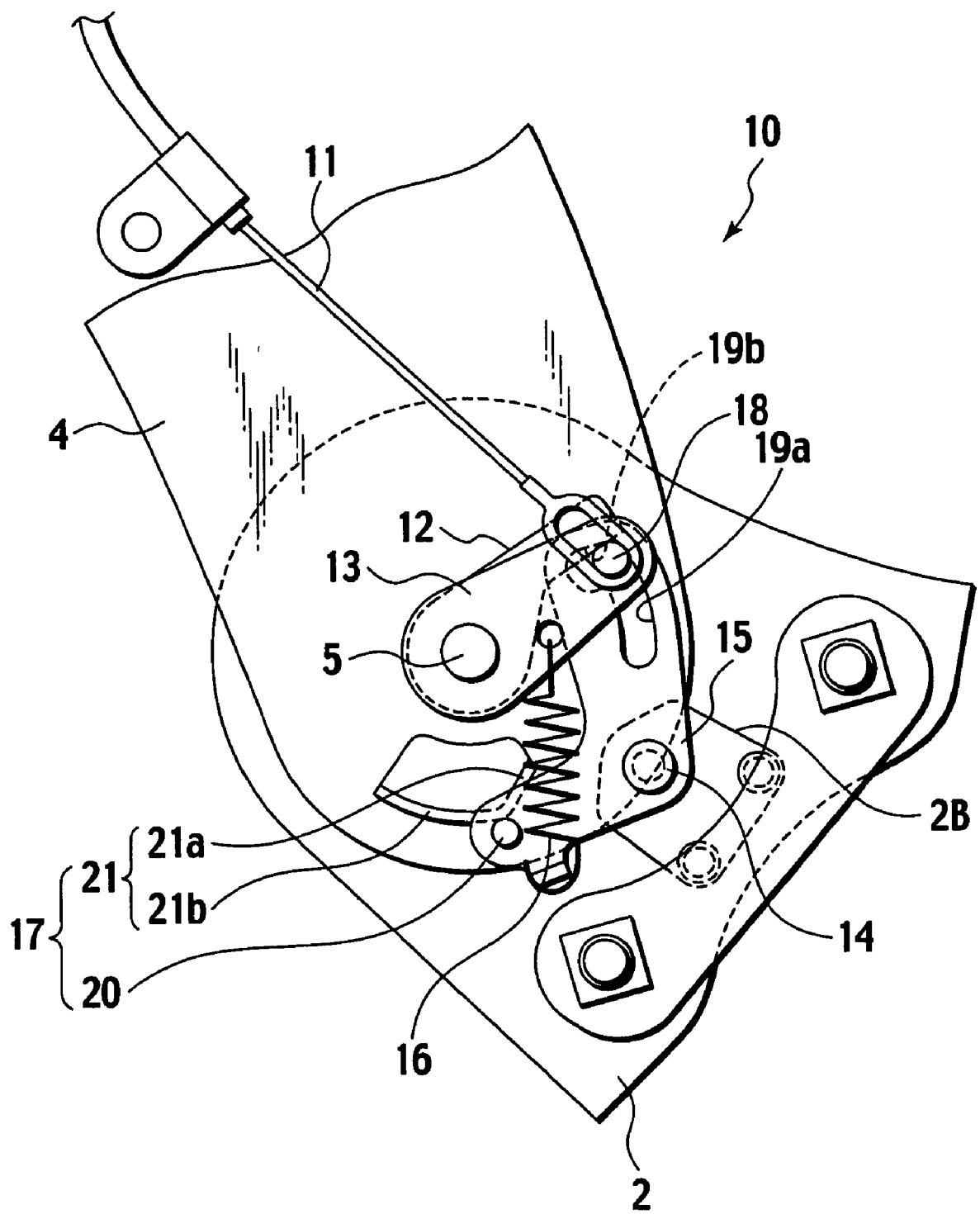
FIG. 9 is a side elevational view for explaining the motion of the neutral position returning means in accordance with the first embodiment of the present invention.

FIGS. 4 to 12 show a first embodiment in accordance with the present invention, in which FIG. 4 is a side elevational view showing a rotating range and each of rotating positions of a seat back 3, FIG. 5 is an exploded perspective view of a seat reclining apparatus A, FIG. 9 is a perspective view of the seat reclining apparatus A, FIG. 4 is a perspective view of the seat reclining apparatus A as seen from an upper side, and FIGS. 8 to 12 are side elevational views for explaining a motion of a neutral position returning means 10.

As shown in FIG. 4, the seat reclining apparatus A is provided in each of both left and right rear portions of a seat cushion 1, and has a pair of base brackets 2 (not shown) fixed to both left and right ends of the seat cushion 1 side, and a pair of arm brackets 4 (not shown) fixed to both left and right ends in the seat back 3 side. A reclining lock mechanisms is arranged between the base brackets 2 (not shown) and the arm bracket 4 (not shown). Accordingly, a pair of arm brackets 4 (not shown) are supported to a pair of base brackets 2 (not shown) so as to be rotatable around each of center shafts 5. A pair of left and fight center shafts 5 (not shown) are connected therebetween via a shaft link rod 5A (shown in FIG. 5). In accordance with this structure, the seat back 3 is rotarably supported to the seat cushion 1 between a most forward reclined position FS and a most rearward inclined flat position PB within a reclining range RR+PR as shown in FIG. 4.

As shown in FIG. 5, the seat reclining apparatus A is provided with a spiral spring 6 which acts as a forward reclining biasing means for biasing the seat back 3 to a forward reclined position, a pair of left and right reclining lock mechanisms 7 (not shown) capable of locking the seat back 3 against the biasing force of the spiral spring 6 within a reclining range in a rear side of the forward reclined position, a reclining operating lever 8 and a forward reclining operating lever 9 releasing the lock of the reclining lock mechanisms 7 (not shown), and a neutral position returning means for returning the reclining lock mechanism 7 to the lock position when the seat back 3 forward reclined by the operation of the forward reclining operating lever 9 is drawn up to a predetermined neutral position NP.

In this case, the neutral position is set at a designed reference position within the reclining range or an optional position which is inclined at a predetermined angle forward and backward from the designed reference position.

The spiral spring 6 which acts as the forward reclining biasing means is arranged in an outer side of the center shaft 5 which acts as a shaft, and is structured such that one end is hooked to a support member 2A provided in the seat cushion side base bracket 2, and the other end side is hooked to a support member 4A provided in the seat back side arm bracket 4. The seat back 3 is biased to the forward reclined position side by the spring force of the spiral spring 6.

A pair of reclining lock mechanisms 7 (not shown) are respectively arranged between the left and right base brackets 2 (not shown) and the arm brackets 4 (not shown). Since a structure of each of the reclining lock mechanisms 7 (not shown) is the same as that described in the prior art, a detailed description is not repeated here. Briefly describing, each of the reclining lock mechanisms 7 (not shown) is positioned at a lock position in which an inner peripheral gear (not shown) and an outer peripheral gear (not shown) are engaged with each other by an biasing force of a lock spring (not shown) in an inner portion within the reclining range so as to lock the seat back 3. Further, the structure is made such that inner peripheral gear (not shown) and the outer peripheral gear (not shown) are apart from each other by the rotation of the center shaft 5, whereby it is possible to release the lock.

The reclining operating lever 8 is fixed to the center shaft 5 protruding from the reclining lock mechanism 7. When rotating the reclining operating lever 8, the center shaft 5 is rotated, whereby it is possible to release the lock of the reclining lock mechanism 7.

The forward reclining operating lever 9 is attached to an upper portion of the seat back 3, and is structured such as to rotate the center shaft 5 via the forward reclining cable 11 and the forward reclining levers 12 and 13.

Figure 2:
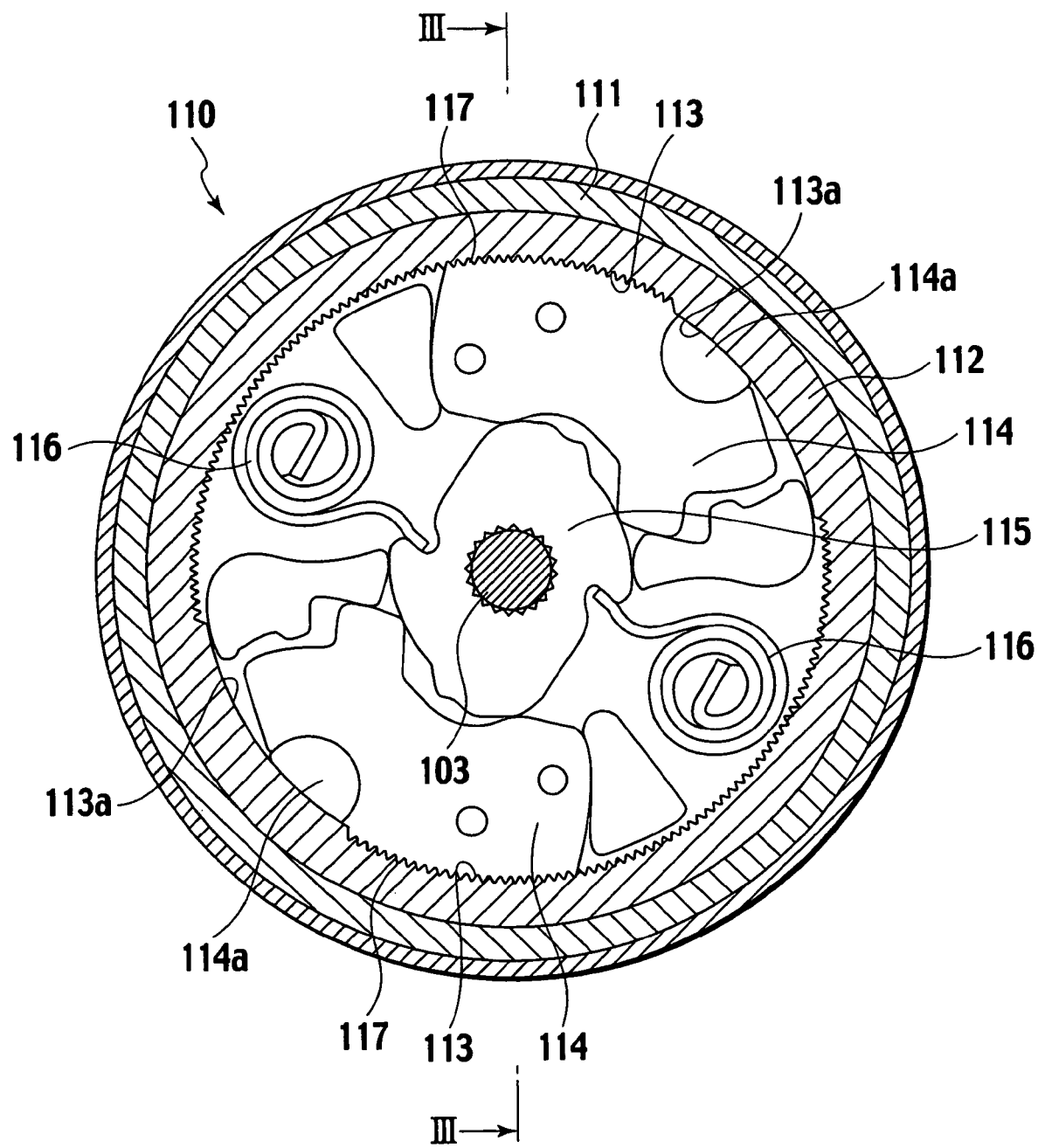
FIG. 2 is a cross sectional view along a line II-II in FIG. 1 in accordance with the prior art.
Figure 3:
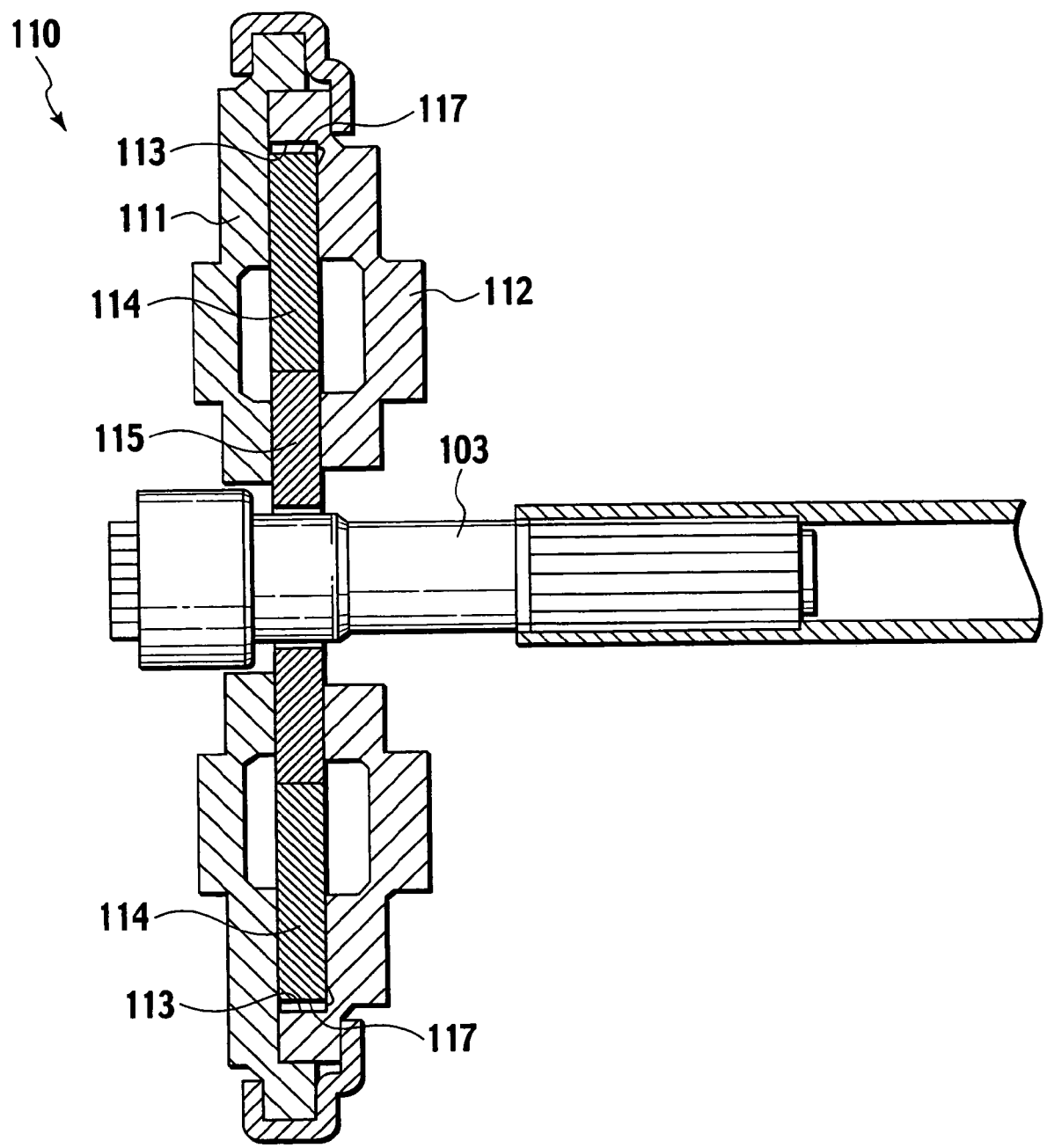
FIG. 3 is a cross sectional view along a line III-III in FIG. 1 in accordance with the prior art.

The forward reclining lever and the neutral position returning means 10 are attached only to one side of a pair of left and right reclining lock mechanisms 7 (not shown). The forward reclining lever has a releasing lever 12 fixed to the center shaft 5 protruding from the reclining lock mechanism 7, and a forward reclining link lever 13 loosely fitted to the center shaft 5 and supported so as to be rotatable around the center shaft 5, as shown in FIGS. 2 to 4. The neutral position returning means 10 is provided with an L-shaped cam plate 15 supported to a fixed bracket 2B fixed to the base bracket 2 so as to be rotatable around a shaft pin 14, a tension coil spring 16 which is a spring hooked between the cam plate 15 and the forward reclining link lever 13, and a cam releasing means 17 for releasing the cam plate 15.

The releasing lever 12 is fixed to the center shaft 5 in a base end side, and is integrally rotated with the center shaft 5. A free end side of the releasing lever 12 is positioned on a rotating locus of a pin 18 provided in a protruding manner in a free end side of the forward reclining link lever 13.

The pin 18 of the forward reclining link lever 13 is inserted to an approximately L-shaped pin inserting groove 19 formed in one free end side of the cam plate 15. Further, a lower end of the forward reclining cable 11 attached to the forward reclining operating lever 9 in an upper end is attached to the pin 18. When operating the forward reclining operating lever 9 from a standby position to the forward reclining operating position, the forward reclining link lever 13 is shifted from a standby position (a position in FIG. 8) to a lever rotating position (a position in FIG. 9) rotating the releasing lever 12, and rotates the releasing lever 12 by the shift so as to actuate the reclining lock mechanism 7.

The cam plate 15 has a pin inserting groove 19 in one free end side. The pin inserting groove 19 is composed of a circular arc shaped guide groove portion 19a formed along a rotating locus of the pin 18 of the forward reclining link lever 13, and a locking groove portion 19b connecting to an upper end of the guide groove portion 19a and extending in a direction orthogonal to the guide groove portion 19a. Further, the pin 18 is inserted to the pin inserting groove 19 as mentioned above. The cam plate 15 is structured such as to freely swing between a lever rotation allowing position (a position in FIG. 9) in which the pin 18 is positioned in the guide groove portion 19a and a rotation inhibiting position (a position in FIG. 10) in which the pin 18 enters the depth of the locking groove portion 19b, in the case that the pin 18 is positioned at an upper end of the guide groove portion 19a. Further, the cam plate 15 has a pin 20 of the cam releasing means 17 in the other free end side, and one end of the tension coil spring 16 is locked to the cam plate 15. The pin 20 will be described later.

The tension coil spring 16 biases the forward reclining link lever 13 to the standby position side, and biases the cam plate 15 to the lever rotation inhibiting position side. In other words, in this embodiment, the tension coil spring 16 serves both as a lever biasing means for biasing the forward reclining link lever 13 to the standby position side, and a cam biasing means for biasing the cam plate 15 to the lever rotation inhibiting position side.

The cam releasing means 17 is composed of the pin 20 provided in a protruding manner in the cam plate 15, and a cam releasing wall 21 fixed to the arm bracket 4. In the case that the cam plate 15 is positioned at the lever rotation inhibiting position, it is set such that an inclined wall portion 21a of the cam releasing wall 21 presses the pin 20 at a position in which the seat back 3 is drawn up to the predetermined neutral position from the forward reclining position side, thereby returning the cam plate 15 from the lever rotation inhibiting position to the lever rotation allowing position. Further, the cam releasing wall 21 is composed of an inclined wall portion 21a and a circular arc shaped portion 21b provided continuously in the inclined wall portion 21a. In the case that the seat back 3 is positioned in the rearward reclined side from the neutral position within the reclining range, the structure is made such that when the forward reclining operating lever 9 is operated to the forward reclining operating position, the circular arc wall portion 21b interferes with the pin 20 so as to hold the cam plate 15 at the lever rotation allowing position.

Next, a description will be given of an operation of the seat reclining apparatus A. It is assumed that the seat back 3 is positioned at an arbitrary position within the reclining range. The reclining lock mechanisms 7 (not shown) are structured such that an outer gear (not shown) of a lock tooth (not shown) is engaged with an inner peripheral gear (not shown) of an arm side disc case (not shown) by a spring force of a lock spring (not shown), thereby the seat back 3 is locked to the seat cushion 1. Further, as shown in FIG. 8, the forward reclining operating lever 9 and the forward reclining link lever 13 is positioned at the standby position by the spring force of the tension coil spring 16, and the cam plate 15 is positioned at the lever rotation allowing position against the spring force of the tension coil spring 16 by the pin 18 of the forward reclining link lever 13 being positioned within the guide groove portion 19a, respectively.

Under the state, when the user operates the forward reclining operating lever 9 from the standby position to the forward reclining operating position, the forward reclining cable 11 is drawn in a direction of an arrow in FIG. 8. Then, the forward reclining link lever 13 rotates in a clockwise direction against the spring force of the tension coil spring 16. The forward reclining link lever 13 rotates from the standby position to the lever rotating position while rotating the releasing lever 12 together therewith as well as the pin 18 moves toward an upper side within the guide groove portion 19a of the cam plate 15, as shown in FIG. 9. The reclining lock mechanisms 7 (not shown) are shifted to the lock released position from the locked position by the rotation of the releasing lever 12. Accordingly, the seat back 3 rotates to the forward reclined position by the biasing force of the spiral spring 6.

Figure 10:
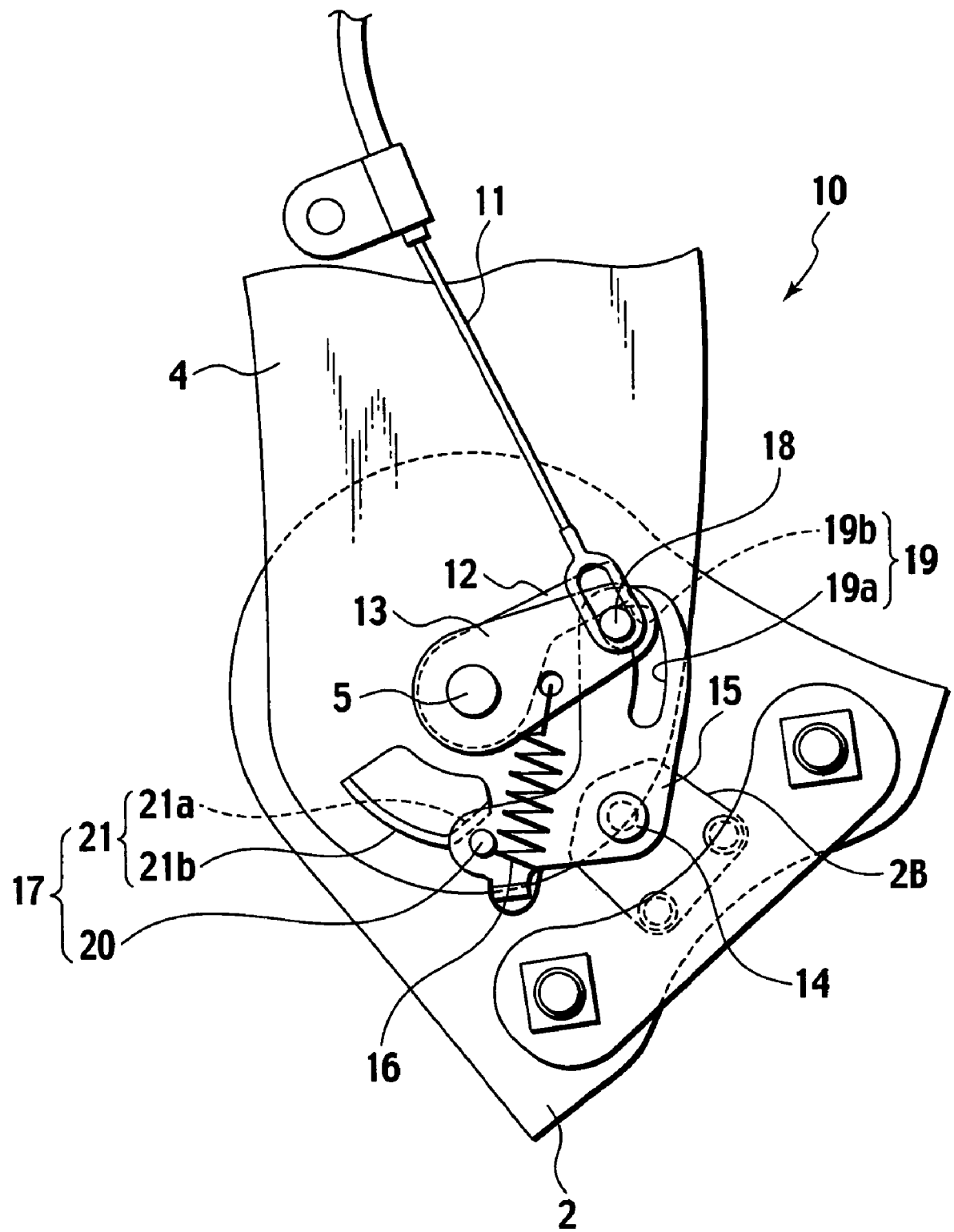
FIG. 10 is a side elevational view for explaining the motion of the neutral position returning means in accordance with the first embodiment of the present invention.
Figure 11:
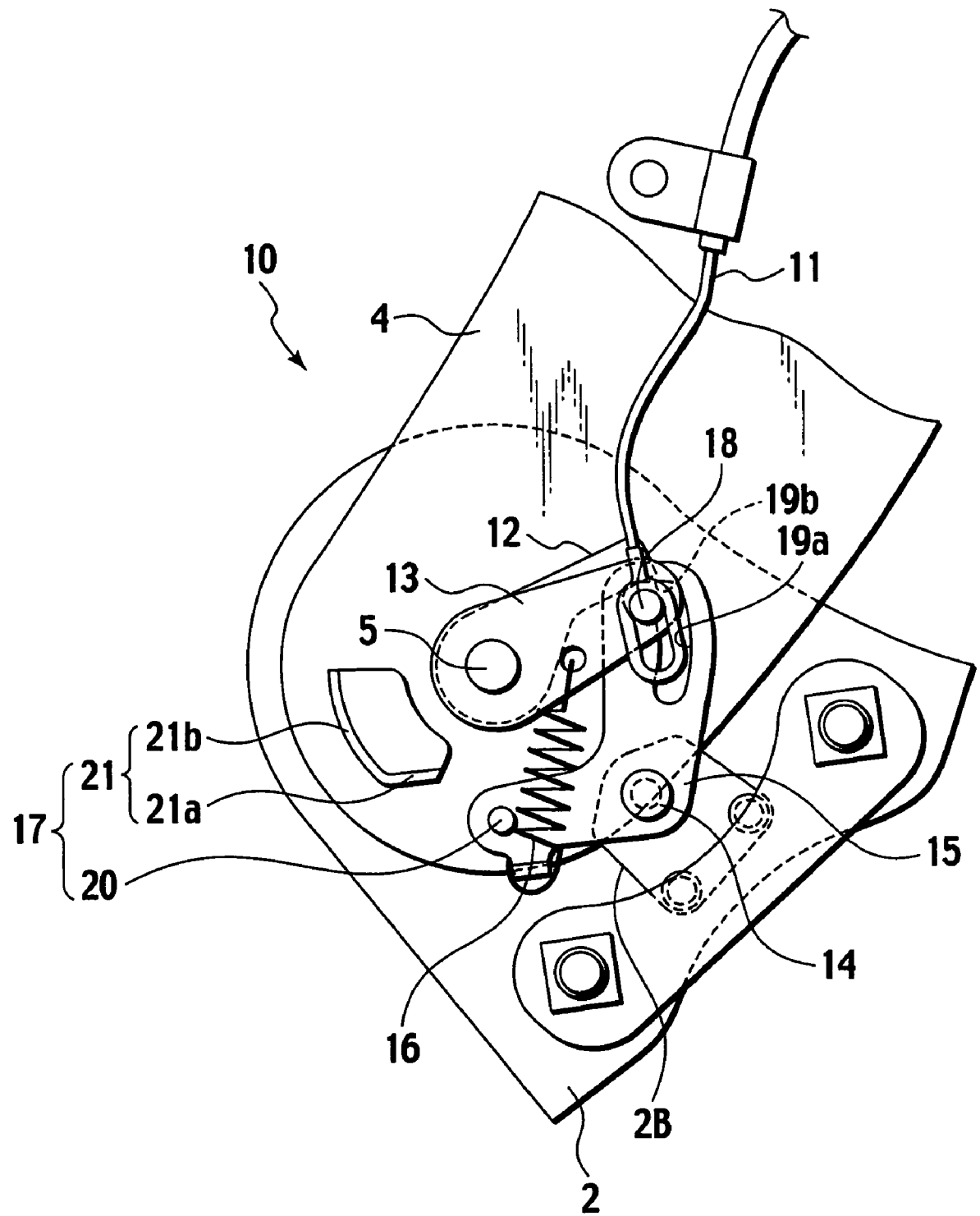
FIG. 11 is a side elevational view for explaining the motion of the neutral position returning means in accordance with the first embodiment of the present invention.

When the forward reclining link lever 13 reaches the lever rotating position, the pin 18 of the forward reclining link lever 13 is positioned in an upper end of the guide groove portion 19a in the cam plate 15. Further, as shown in FIG. 10, since the cam releasing wall 21 moves from the position engaging with the pin 20, the cam plate 15 rotates in a counterclockwise direction by the spring force of the tension coil spring 16, and the cam plate 15 rotates to the lever rotation inhibiting position. The pin 18 of the forward reclining link lever 13 enters the depth of the locking groove 19b of the cam plate 15. Accordingly, the forward reclining link lever 13 is held at the forward reclining operating position, and the reclining lock mechanisms 7 (not shown) are held at the lock released position via the releasing lever 12.

Figure 12:
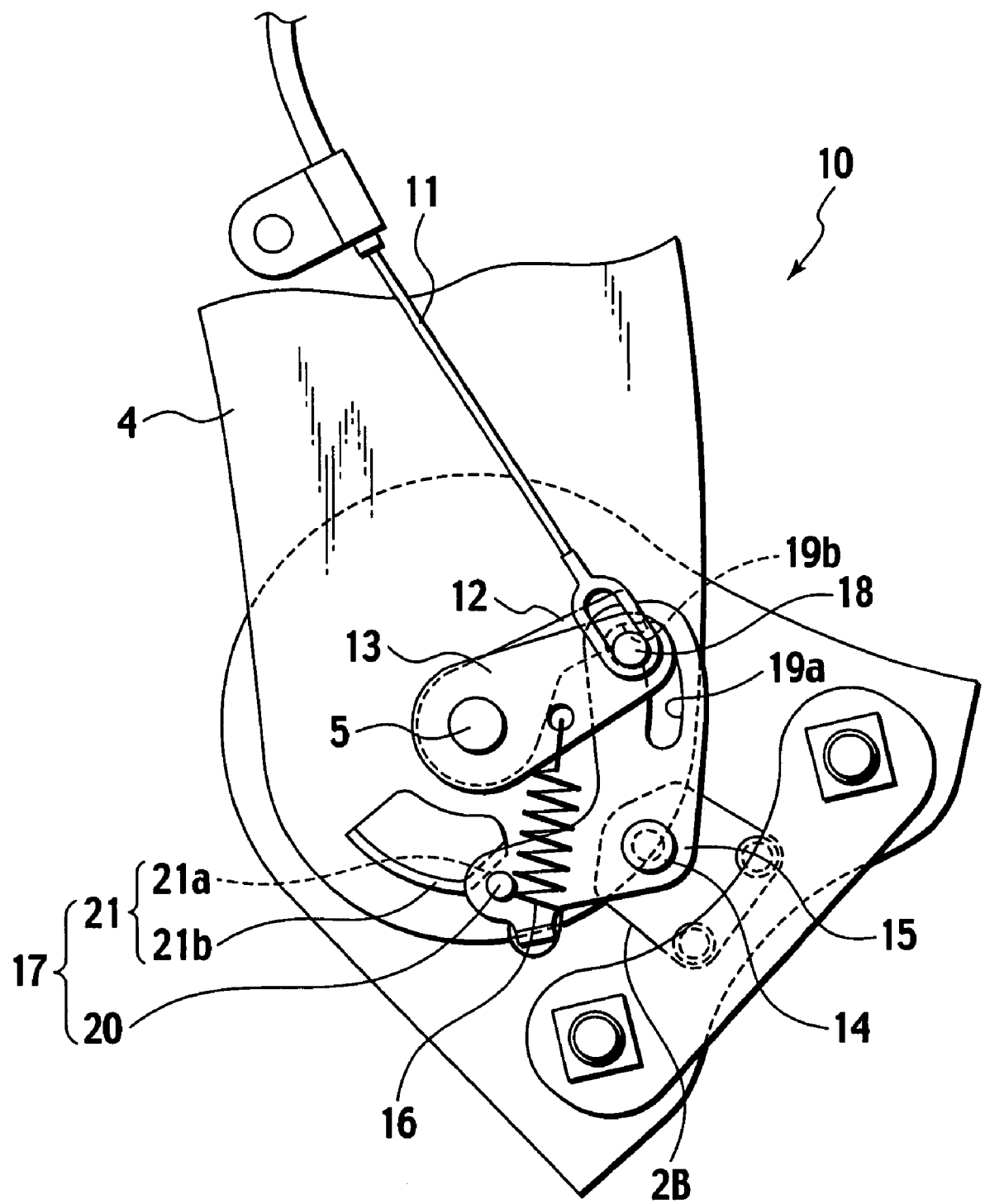
FIG. 12 is a side elevational view for explaining the motion of the neutral position returning means in accordance with the embodiment of the present invention.

The user draws up the seat back 3 against the spring force of the spiral spring 6 so as to return the seat back 3 to the desired reclining range. When the seat back 3 is drawn up to the neutral position, the inclined wall portion 21a of the cam releasing wall 21 presses the pin 20 of the cam plate 15, as shown in FIG. 12. The cam plate 15 is shifted from the lever rotation inhibiting position to the lever rotation allowing position against the spring force of the tension coil spring 16 by the pressing force, and the pin 18 of the forward reclining link lever 13 enters the guide groove portion 19a of the cam plate 15. Then, the forward reclining link lever 13 is returned to the standby position from the lever rotating position by the spring force of the tension coil spring 16. When the forward reclining link lever 13 is returned to the standby position, the releasing lever 12 and the center shaft 5 are rotated by the lock biasing force of the reclining lock mechanisms 7 (not shown), and the reclining lock mechanisms 7 (not shown) are set at the lock position. Accordingly, the seat back 3 is locked at the neutral position.

As mentioned above, the seat reclining apparatus A is provided with a neutral position returning means 10 for holding the forward reclining lever at the forward reclining operating position when the forward reclining lever is operated from the standby position to the forward reclining operating position, and releasing the holding of the forward reclining lever when the seat back 3 is shifted to the predetermined neutral position within the reclining range from the forward reclined position side. Since the structure is made such that the neutral position returning means 10 locks the forward reclining lever and release the lock as mentioned above, it is possible to achieve a simple structure and a reduced cost. Since the neutral position returning means 10 is structured such as to lock the forward reclining lever and release the lock, the neutral position returning means 10 can be installed in an external portion of the reclining lock mechanisms 7 (not shown). Accordingly, the neutral position returning means 10 can be installed by slightly changing the design, and can be easily installed later in the existing seat reclining apparatus.

Further, when returning the seat back 3 to the reclining range, the seat back 3 is returned to the predetermined neutral position regardless of the position just before the reclining. Accordingly, an improved usability can be obtained. In other words, when returning the seat back 3 at the flat position to the reclining range after forward reclining, the seat back 3 is returned to the predetermined neutral position in place of the flat position. Accordingly, a convenience can be achieved. Further, since the load applied from the seat back 3 is received by the reclining lock mechanisms 7 (not shown), it is not necessary to control the strength of the neutral position returning means 10.

In this embodiment, the forward reclining link lever 13 as the forward reclining lever actuating the neutral position returning means 10 is set independent from the reclining operating lever 8 executing the normal reclining operation, and the forward reclining link lever 13 is held at the standby position without being operated to the forward reclining operating position at a time of operating the reclining operating lever 8 to the lock releasing position. Accordingly, when operating the reclining operating lever 8, the neutral position returning means 10 is not actuated, and the neutral position returning means 10 can be actuated only when operating the forward reclining operating lever 9 so as to shift the forward reclining link lever 13. Further, since the forward reclining link lever 13 is not shifted when the normal reclining operation by the reclining operating lever 8, it is possible to lighten the operating force, it is possible to make an inertial mass of the operating system small, and it is possible to prevent the gear jump of the reclining lock mechanism 7.

In this embodiment, the forward reclining lever is fixed to the center shaft 5 shifting the reclining lock mechanisms 7 (not shown) between the lock position and the lock released position, and is provided with a releasing lever 12 integrally rotating with the center shaft 5, and a forward reclining link lever 13 associated with the forward reclining operating lever 9, shifting from the standby position to the lever rotating position against the tension coil spring 16 when the forward reclining operating lever 9 is shifted to the forward reclining operating position from the standby position and rotating the releasing lever 12 together therewith during the shifting process so as to shift the reclining lock mechanisms 7 (not shown) from the lock position to the lock released position. The neutral position returning means 10 is constituted of the cam plate 15 shifting from the lever rotation allowing position for allowing the rotation of the forward reclining link lever 13 to the lever rotation inhibiting position for inhibiting the rotation of the forward reclining link lever 13 by the biasing force of the tension coil spring 16 when the forward reclining link lever 13 is shifted to the lever rotating position, and of the cam releasing means 17 returning the cam plate 15 from the lever rotation inhibiting position to the lever rotation allowing position against the biasing force of the tension coil spring 16 so as to make the rotation of the forward reclining link lever 13 free when the seat back 3 is shifted from the forward reclined position side to the predetermined neutral position. Accordingly, since the forward reclining lever and the neutral position returning means 10 can be composed of the releasing lever 12, the forward reclining link lever 13, the cam plate 15, the cam releasing means 17 and the spring 16, it is possible to achieve these elements by a reduced number of parts.

In this embodiment, since the forward reclining link lever 13 is rotatable around the center shaft 5, and is supported in such a manner as to rotate independently from the center shaft 5 and the releasing lever 12, it is possible to arrange the releasing lever 12 and the forward reclining link lever 13 around the center shaft 5. Accordingly, it is possible to make the structure compact on the basis of a high density arrangement of the parts.

In this embodiment, since the cam biasing means and the lever biasing means are composed of the single tension coil spring 16 interposed between the forward reclining link lever 13 and the cam plate 15, it is possible to further reduce the number of the parts. Accordingly, it is possible to achieve a simple structure and a cost reduction. In this case, it is obvious that the cam biasing means and the lever biasing means can be composed of the independent springs or the like.

In this embodiment, the cam releasing means 17 is composed of the pin 20 provided in the cam plate 15, and the cam releasing wall 21 moving associated with the seat back 3 and pressing the pin 20 so as to shift the cam plate 15 to the lever rotation allowing position when the seat back 3 is shifted from the forward reclined position side to the predetermined neutral position. Further, since the cam releasing wall 21 is structured such as to interfere with the pin 20 so as to hold the cam plate 15 at the lever rotation allowing position even in the case that the seat back 3 is positioned in the rearward reclined side from the neutral position within the reclining range, it is possible to regulate the shift of the cam plate 15 when the forward reclining operating lever 9 is operated in the case that the seat back 3 is positioned in the rearward reclined side from the neutral position within the reclining range. Accordingly, it is possible to prevent the disadvantage caused by the matter that the pin 20 of the cam plate 15 runs on the cam releasing wall 21. Therefore, in the case of adjusting the seat back 3 to the optional position in the rearward reclined side from the neutral position, the normal reclining operation can be also executed by operating the forward reclining operating lever 9. Further, the neutral position can be freely set by varying a relative position between the pin 20 and the cam releasing wall 21.

Figure 13:
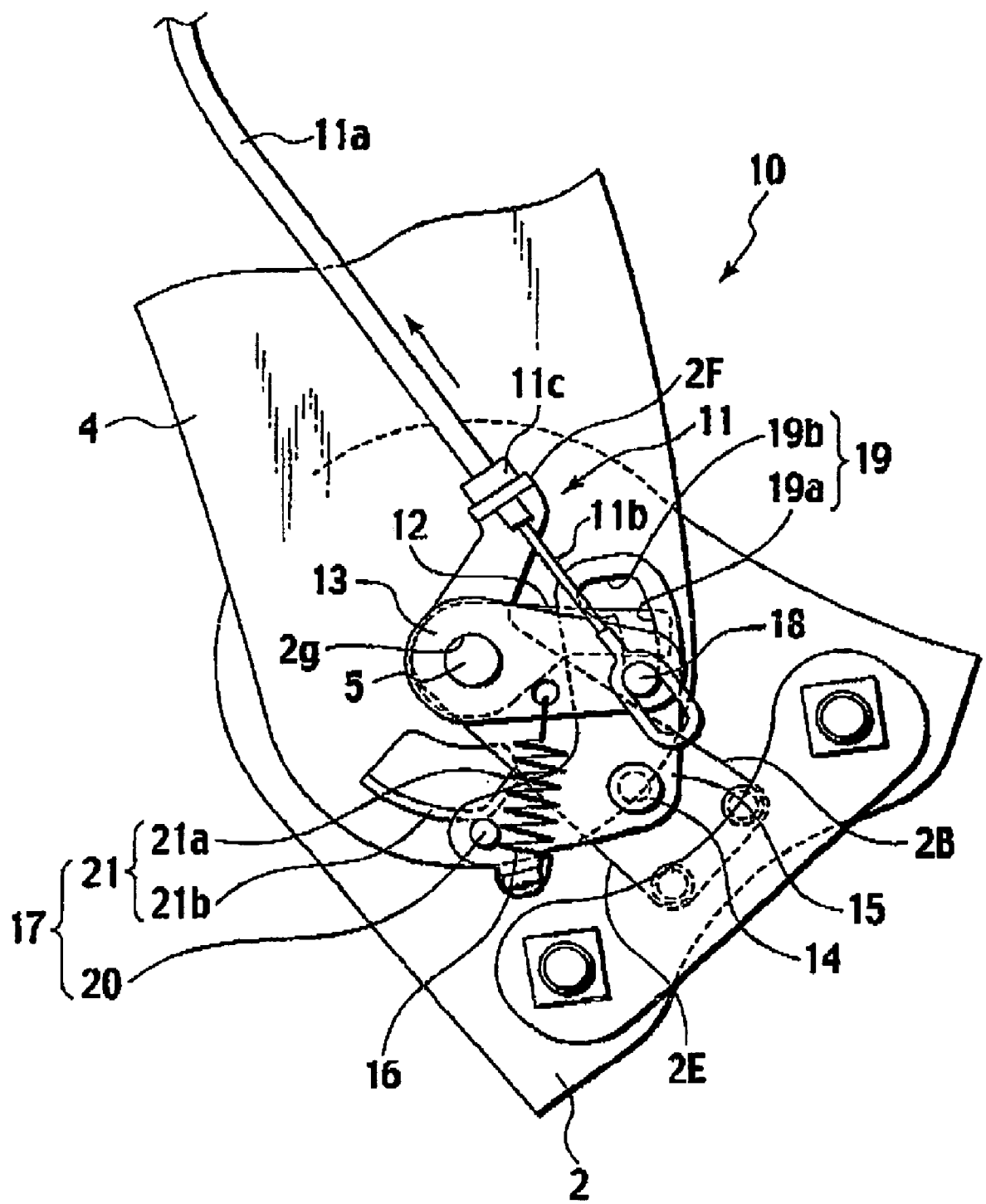
FIG. 13 is a side elevational view for explaining a motion of a neutral position returning means in accordance with a second embodiment of the present invention.

FIG. 13 is a side elevational view showing the other aspect of a neutral position returning means of a seat reclining apparatus in accordance with a second embodiment. The present embodiment in FIG. 13 is widely different from the first embodiment shown in FIGS. 4 to 12 in a point that a method of fixing the forward reclining cable 11 is clearly defined, and the structure for executing the reclining operation is the same.

The forward reclining cable 11 is composed of an outer tube 11a and an inner wire 11b. The inner wire 11b is slidably inserted into the outer tube 11a.

When operating the forward reclining operating lever 9, the outer tube 11a stays being fixed, the inner wire 11b slides within the outer tube 11a, the pin 18 fixed to one end moves within the pin inserting groove 19, and the link lever 13 rotates. In this case, the structure of the forward reclining cable 11 is the same as the first embodiment.

In the second embodiment, the outer tube 11a is fixed to the base bracket 2 side in such a manner that a positional relation between an end portion 11c of the outer tube 11a and the pin 18 of the forward reclining link lever 13 does not change, and the structure is made such that the operating amount of the forward reclining operating lever 9 is fixed even in the case that the position of the seat back 3 is changed.

Further, in the present embodiment, the outer tube 11a is held by using a fixing bracket 2E in such a manner that the positional relation between the end portion 11c of the outer tube 11a and the base bracket 2 does not change.

The fixing bracket 2E is formed in an approximately L shape, is provided in a center portion thereof with an inserting hole 2g to which the center shaft 5 is rotatably inserted, and is provided in one end side thereof with an attaching portion 2F to which the end portion 11c of the outer tube 11a to which the forward reclining cable 11 is inserted to the inner portion is fixed. Further, the other end side of the fixing bracket 2E is fixed to the base bracket 2 in the same manner as that of the fixing bracket 2B.

Figure 14:
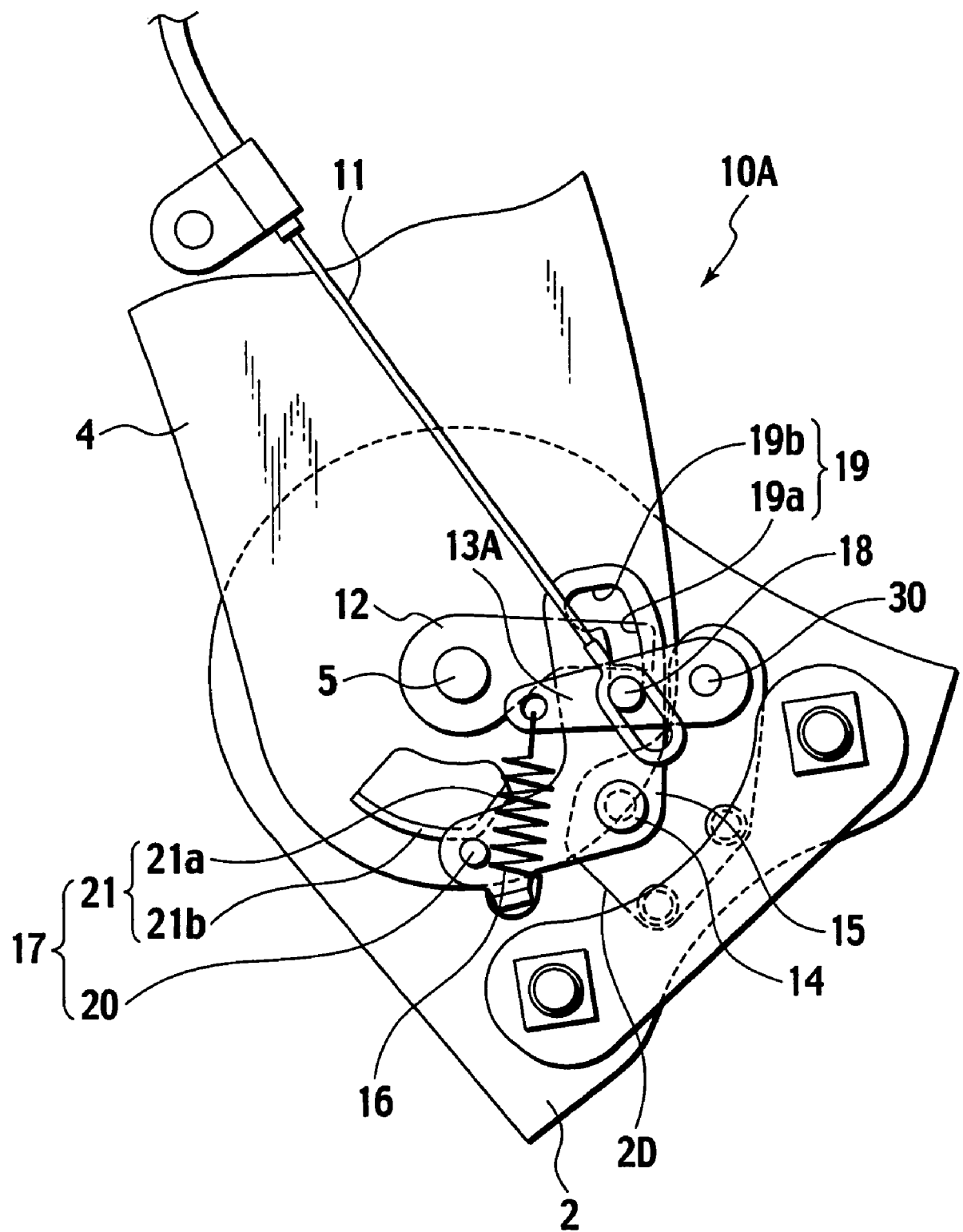
FIG. 14 is a side elevational view for explaining a motion of a neutral position returning means of a seat reclining apparatus in accordance with a third embodiment of the present invention.

FIG. 14 is a side elevational view of a neutral position returning means 10A of a seat reclining apparatus in accordance with a third embodiment of the present invention. In FIG. 14, the neutral position returning means 10A is structured such that a forward reclining link lever 13A is rotatably supported to a fixing bracket 2D of the base bracket 2 via a shaft pin 30. In other words, the forward reclining link lever 13A is rotatably supported at a different position from the center of the center shaft 5. since the other structures are basically the same as the embodiment mentioned above while being different in shapes of the respective parts, the same reference numerals are given to the same constituting parts and a description thereof is not repeated here.

In this third embodiment, since the forward reclining link lever 13A is rotatably supported at the different position from the center of the center shaft 5, freedom in arrangement between the releasing lever 12 and the forward reclining link lever 13A is widened. Accordingly, freedom in design is increased. Further, since the load applied to the center shaft 5 is lightened, a reliability of the actuation of the center shaft 5 is increased.

In this case, in accordance with the embodiments mentioned above, the neutral position returning means 10 and 10A are provided in only one of a pair of left and right reclining lock mechanisms 7 (not shown), however, it is obvious that the neutral position returning means 10 and 10A may be provided in both of the reclining lock mechanisms 7 (not shown).

The entire contents of Japanese Patent Application 2004-310930 (filed on Oct. 26, 2004) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A seat reclining apparatus, comprising:
   a seat cushion;
   a seat back rotatably supported to the seat cushion;
   a forward reclining biasing means for biasing the seat back to a forward reclined position side;
   a reclining lock mechanism shifting the seat back between a lock position locked at an optional position in a reclining range and a lock release position releasing the lock, and exposed to a lock biasing force toward the lock position side;
   a forward reclining lever shifting the reclining lock mechanism to the lock release position, in which the reclining lock mechanism is shifted to the lock release position from the lock position by operating the forward reclining lever to a forward reclining operating position, and the seat back is shifted to the forward reclined position by an biasing force of the forward reclining biasing means; and a neutral position returning means holding the forward reclining lever operated to the forward reclining operating position at the forward reclining operating position in the case that the seat back exists in a forward reclined side from a predetermined neutral position set within the reclining range, and not holding the forward reclining lever in the case that the seat back exists in a rearward reclined side from the neutral position;

wherein the forward reclining lever comprises:

a releasing lever fixed to a shaft shifting the reclining lock mechanism between the lock position and the lock release position, and integrally rotating with the shaft; and a forward reclining link lever associated with a forward reclining operating lever provided in an upper portion of the seat back, shifting from a standby position to a lever rotational position against a biasing force of a lever biasing means when the forward reclining operating lever is shifted from the standby position to the forward reclined position, and rotating the releasing lever together therewith during the shifting process so as to shift the reclining lock mechanism from the lock position to the lock release position, and wherein the neutral position returning means comprises:

a cam plate capable of shifting between a lever rotation allowing position allowing the rotation of the forward reclining link lever and a lever rotation inhibiting position inhibiting the rotation of the forward reclining link lever, when the forward reclining link lever exists at the lever rotating position;

a cam biasing means for biasing the cam plate to the lever rotation inhibiting position side; and a cam releasing means for shifting the cam plate from the lever rotation inhibiting position to the lever rotation allowing position against the biasing force of the cam biasing means when the seat back is shifted from the forward reclined position side to the predetermined neutral position, and holding the cam plate at the lever rotation allowing position when the seat back exists in a backward reclined side from the neutral position.

2. A seat reclining apparatus according to claim 1,
wherein the forward reclining link lever is rotatable around the shaft, and is supported in such a manner as to independently rotate from the shaft and the releasing lever.

3. A seat reclining apparatus according to any one of claim 1,
wherein the forward reclining link lever is rotatably supported at the other position than a center of the shaft.

4. A seat reclining apparatus according to claim 1,
wherein the cam biasing means and the lever biasing means are composed of one spring interposed between the forward reclining link lever and the cam plate.

5. A seat reclining apparatus according to claim 1,
wherein the cam releasing means comprises:

a pin provided in a free end portion of the cam plate; and a cam releasing wall moving associated with the seat back, and pressing the pin so as to displace the cam plate to a lever rotation allowing position in the case that the seat back is shifted from the forward reclined position side to the predetermined neutral position; and wherein the cam releasing wall interferes with the pin even in the case that the seat back is positioned at a backward reclined side from the neutral position within the reclining range, thereby holding the cam plate at the lever rotation allowing position.

* * * * *